(12) United States Patent
Folch Cortés et al.

(10) Patent No.: US 9,359,085 B2
(45) Date of Patent: Jun. 7, 2016

(54) AIRCRAFT WITH FUSELAGE-MOUNTED ENGINES AND AN INTERNAL SHIELD

(71) Applicant: AIRBUS OPERATIONS S.L., Getafe, Madrid (ES)

(72) Inventors: Diego Folch Cortés, Madrid (ES); Eduardo Vinué Santolalla, Madrid (ES); Esteban Martino González, Madrid (ES); Julien Guillemaut, Madrid (ES); Pablo Goya Abaurrea, Madrid (ES)

( * ) Notice: Subject to any disclaimer, the term of this patent is extended or adjusted under 35 U.S.C. 154(b) by 458 days.

(21) Appl. No.: 13/724,360

(22) Filed: Dec. 21, 2012

(65) Prior Publication Data

US 2013/0214090 A1     Aug. 22, 2013

(30) Foreign Application Priority Data

Dec. 28, 2011    (EP) .................................. 11382409

(51) Int. Cl.
*B64D 45/00*       (2006.01)
*B64C 1/06*        (2006.01)
(Continued)

(52) U.S. Cl.
CPC .   *B64D 45/00* (2013.01); *B64C 1/06* (2013.01); *B64C 1/10* (2013.01); *B64D 27/02* (2013.01); *B64D 27/14* (2013.01); *B64D 27/20* (2013.01); *B64D 2027/005* (2013.01); *Y02T 50/66* (2013.01)

(58) Field of Classification Search
CPC .............. B64C 1/06; B64C 1/10; B64C 1/16; B64C 1/062; B64C 39/10; B64C 39/105; B64D 27/02; B64D 27/14; B64D 29/04; B64D 45/00; B64D 2027/005; B64D 11/0023; B64D 2045/005; B64D 45/0015; G06F 2217/46; G06F 2217/44

See application file for complete search history.

(56) References Cited

U.S. PATENT DOCUMENTS 1,402,431 A    1/1922   Mix
3,405,893 A   10/1968   Flamand
(Continued)

FOREIGN PATENT DOCUMENTS

WO    WO 2009/068638    6/2009

OTHER PUBLICATIONS

D.A. Shockey, Jeffrey W. Simons, and David C. Elrich. "Improved Barriers to Turbine Engine Fragments: Interim Report I" (Jun. 1999). Report No. DOT/FAA/AR-99/8,I.*

(Continued)

*Primary Examiner* — Philip J Bonzell
*Assistant Examiner* — Michael Kreiner
(74) *Attorney, Agent, or Firm* — Jenkins, Wilson, Taylor & Hunt, P.A.

(57) ABSTRACT

Internal shield in the rear fuselage of an aircraft having a propulsion system formed by two engines mounted on each side of it; the rear fuselage having at least a vertical symmetry plane; the rear fuselage being made of a composite material; the internal shield being located in said vertical symmetry plane and extended in an area that covers the possible trajectories of a set of pre-defined fragments detached from one of said engines in a failure event that would impact on critical elements of the opposite engine; the internal shield having a flat shape and an energy absorption capability that allows stopping said fragments. The invention also refers to a method for determining the area of an internal shield and to an aircraft having said internal shield.

9 Claims, 2 Drawing Sheets

(51) Int. Cl.
    *B64D 27/14*     (2006.01)
    *B64D 27/02*     (2006.01)
    *B64C 1/10*     (2006.01)
    *B64D 27/20*     (2006.01)
    *B64D 27/00*     (2006.01)

(56) References Cited

U.S. PATENT DOCUMENTS

| | | | |
|---|---|---|---|
| 4,674,712 A | | 6/1987 | Whitener |
| 5,114,097 A | * | 5/1992 | Williams ................ 244/119 |
| 6,068,212 A | * | 5/2000 | Ash et al. ................ 244/54 |
| 6,114,050 A | * | 9/2000 | Westre et al. ................ 428/608 |
| 6,676,079 B2 | * | 1/2004 | Takeshima ......... B64D 11/0023 244/118.5 |
| 7,261,257 B2 | * | 8/2007 | Helou, Jr. ................ 244/137.1 |
| 2011/0233335 A1 | | 9/2011 | Vinue et al. |
| 2013/0001356 A1 | * | 1/2013 | Llamas Sandin ......... B64C 1/26 244/54 |

OTHER PUBLICATIONS

D.A. Shockey, Jeffrey W. Simons, and David C. Elrich. "Improved Barriers to Turbine Engine Fragments: Interim Report II" (May 1999). Report No. DOT/FAA/AR-99/8,II.*

Donald A. Shockey, David C. Elrich, and Jeffrey W. Simons. "Improved Barriers to Turbine Engine Fragments: Interim Report III" (May 2001). Report No. DOT/FAA/AR-99/8,III.*

Donald A. Shockey, David C. Erlich [sic], Jeffrey W. Simons, and Hyung-Seop Shin. "Improved Barriers to Turbine Engine Fragments: Interim Report IV" (Jun. 2002). Report No. DOT/FAA/AR-99/8,IV.*

Donald A. Shockey, David C. Erlich, and Jeffrey W. Simons. "Improved Barriers to Turbine Engine Fragments: Final Annual Report" (Jun. 2002). Report No. DOT/FAA/AR-99/8,V.*

Silvia Seng, John Manion, and Chuck Frankenberger. "Uncontained Engine Debris Analysis Using The Uncontained Engine Debris Damage Assessment Model" (Sep. 2004). Report No. DOT/FAA/AR-04/16.*

Steven J. Lundin and Richard B. Mueller. "Advanced Aircraft Materials, Engine Debris Penetration Testing" (Dec. 2005). Report No. DOT/FAA/AR-03/37.*

D. A. Shockey, J. H. Giovanola, J. W. Simons, D.C. Erlich, R.W. Klopp, and S.R. Skaggs. "Advanced Armor Technology: Application Potential for Engine Fragment Barriers for Commercial Aircraft" (Sep. 1997). Report No. DOT/FAA/AR-97/53.*

European Patent Application No. 11382409.8 dated Dec. 28, 2011.
European Search Report for Application No. 11 38 2409 dated Jul. 18, 2012.

* cited by examiner

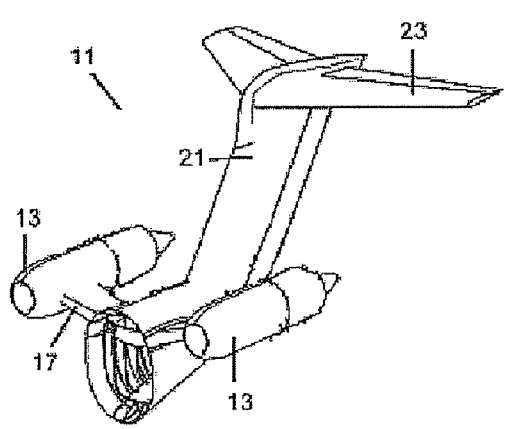
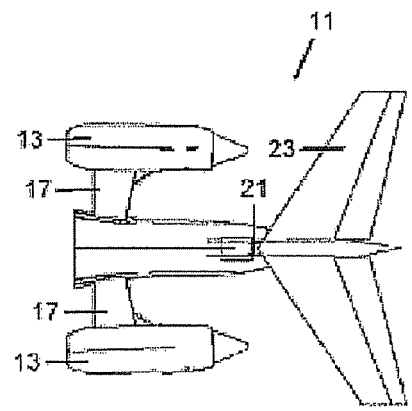
FIG. 1a  FIG. 1b
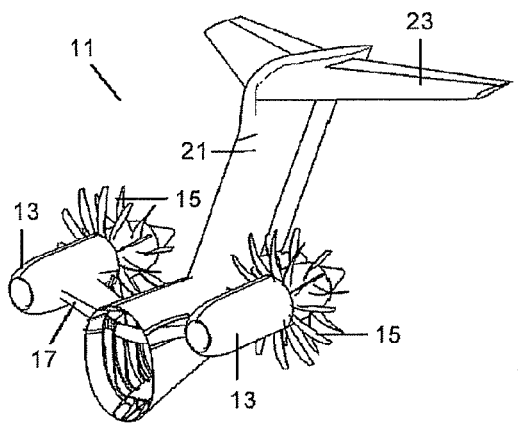
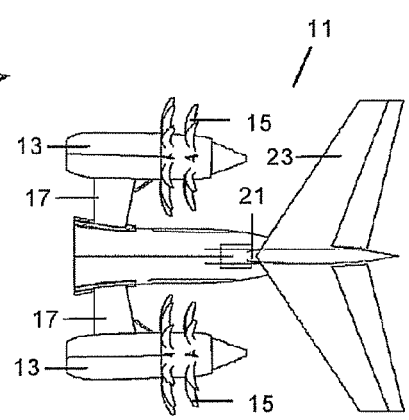
FIG. 2a  FIG. 2b
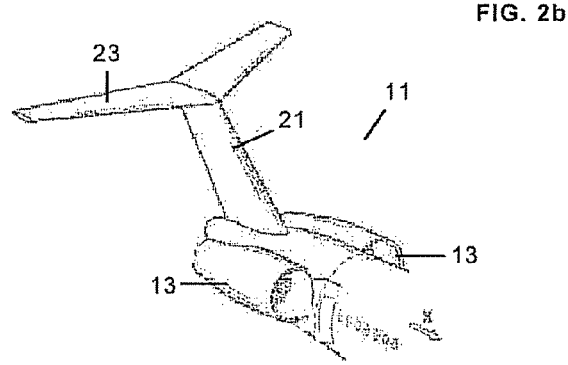
FIG. 3

AIRCRAFT WITH FUSELAGE-MOUNTED ENGINES AND AN INTERNAL SHIELD

CROSS-REFERENCE TO RELATED APPLICATION

This U.S. non-provisional patent application claims priority to European Patent Application No. 11382409.8 filed on Dec. 28, 2011, the entire content of which is hereby incorporated by reference herein.

FIELD OF THE INVENTION

The present invention relates to an aircraft equipped with fuselage-mounted engines and, more particularly, to the protection of said engines against the risk of being impacted by a part detached from the opposite engine in case of a failure.

BACKGROUND OF THE INVENTION

There are known aircraft equipped with two engines mounted on the rear fuselage such as those shown in FIGS. 1a, 1b, 2a, 2b and 3.

FIGS. 1a and 1b show an aircraft with two turbofan engines 13 attached to the rear fuselage 11 by means of pylons 17 and an empennage comprising a vertical tail plane 21 and an upper horizontal tail plane 23 behind the propulsion system.

FIGS. 2a and 2b show an aircraft with two turboprop engines 13 attached to the rear fuselage 11 by means of pylons 17 and an empennage comprising a vertical tail plane 21 and an upper horizontal tail plane 23 behind the propulsion system.

FIG. 3 shows an aircraft with two turbofan engines 13 attached directly to the rear fuselage 11 and an empennage comprising a vertical tail plane 21 and an upper horizontal tail plane 23 behind the propulsion system.

In these aircraft, failure events such as a Blade Release (BR) event, i.e. an event where an external blade of one turboprop engine comes off and hits the fuselage, or an Uncontained Engine Rotor Failure (UERF) event, i.e. an event where a part of the internal rotors of the engine breaks, it is released and hits the fuselage, can generate large damages on the fuselage and also in the opposite engine. In the last case, the effects can be catastrophic.

Although engine manufacturers are making efforts to reduce the probability of said failure events, experience shows that UERF and BR events that can lead to catastrophic events continue to occur.

The certification requirements are very restrictive and are driving both fuselage and systems architectures in order to fulfill safety requirements.

As is well known, weight is a fundamental aspect in the aeronautic industry and therefore there is a trend to use structures of a composite material instead of a metallic material even for primary structures such as fuselages.

The composite materials that are most used in the aeronautical industry consist of fibers or fiber bundles embedded in a matrix of thermosetting or thermoplastic resin, in the form of a preimpregnated or "prepreg" material. Their main advantages refer to:

Their high specific strength with respect to metallic materials. It is the strength/weight equation.
Their excellent behavior under fatigue loads.
The possibilities of structural optimization thanks to the anisotropy of the material and the possibility of combining fibers with different orientations, allowing the design of the elements with different mechanical properties to be adjusted to the different needs in terms of applied loads.

The disadvantage of the usual composite materials made of carbon fibers compared to conventional light weight metallic materials like the aluminum, is their lower impact resistance and damage tolerance capabilities. No plasticity behavior as on metallic materials is present in composite materials and they are not able to absorb high strain energy amounts when deforming.

There is therefore a need of fuselage structures capable to satisfy the safety requirements particularly when they are made up of composite materials.

Some proposals of impact resistant and damage tolerant fuselages are known in the prior art, which are capable of maintaining enough torsional strength when a part of the fuselage is removed as a consequence of one of said engine failure events for proceeding to the so called "get home mission with, only, the undamaged engine, such as those disclosed on WO 2009/068638 and US 2011/233335.

However none of the above-mentioned proposals can efficiently protect an engine (including systems such as electrical generation and fuel feed that are critical ones) from the risk of being damaged by a detached part from the opposite engine.

The present invention is addressed to the solution of this drawback.

SUMMARY OF THE INVENTION

An object of this invention is to provide an aircraft equipped with two engines mounted on the rear fuselage that is capable of efficiently protecting an engine from the risk of being damaged by a detached part from the opposite engine.

In one aspect, this and another objects are met by an internal shield in the rear fuselage of an aircraft having a propulsion system formed by two engines mounted on each side of it; the rear fuselage having a vertical symmetry plane; the rear fuselage being made of a composite material; the internal shield being located in said vertical symmetry plane and extended in an area that covers the possible trajectories of a set of pre-defined fragments detached from one of said engines in a failure event that would impact on critical elements of the opposite engine; the internal shield having a flat shape an energy absorption capability that allows stopping said fragments.

The set of pre-defined fragments to be considered in said possible trajectories will be selected by taking into account, among other factors, the aircraft certification requirements and the energy absorption capability of the rear fuselage.

In one embodiment, the energy absorption capability of the shield is comprised between 5-100 KJ. It is considered that this energy range covers the needs of different configurations of propulsion systems mounted on the rear fuselage of an aircraft.

The internal shield can be made of a rigid material, a deformable material or a combination of several layers of rigid and/or deformable materials.

Advantageously, a rigid material is one of the following: titanium, high performance steel, aluminum, carbon fiber reinforced material, glass fiber reinforced material, kevlar fiber reinforced material, ceramic material.

Advantageously, a deformable material is one of the following: an aramid dry fabric, a poly-paraphenylene-2 6-benzobisozazole (PBO) dry fabric, ultra-high molecular weight polyethylene fibers (UHMWPE).

In another aspect, the above-mentioned objects are met by a method for determining the area of an internal shield in the rear fuselage of an aircraft having a propulsion system formed by two engines mounted on each side of it; the internal shield being located in said vertical symmetry plane for stopping fragments detached from one of said engines in a failure event that would impact on critical elements of the opposite engine; the method comprising the following steps:

- choosing a set of detached fragments from an engine;
- associating to said set of detached fragments their possible trajectories in an engine failure event;
- selecting the sub-set of said trajectories that would impact on critical areas of the opposite engine;
- calculating the intersections of said sub-set of trajectories with the vertical plane of symmetry of the rear fuselage;
- obtaining an envelope of straight borders of said intersections.

In another aspect, the above-mentioned objects are met by an aircraft having a propulsion system formed by two engines mounted on each side of its rear fuselage; the rear fuselage having a curved shape with at least a vertical symmetry plane and a central longitudinal axis; the rear fuselage comprising a skin and a plurality of frames arranged perpendicularly to said longitudinal axis; the rear fuselage being made of a composite material; in which the rear fuselage comprises an internal shield located in said vertical symmetry plane and extended in an area that covers the possible trajectories of a set of pre-defined fragments detached from one of said engines in a failure event that would impact on critical elements of the opposite engine; the internal shield having a flat shape and an energy absorption capability that allows stopping said fragments.

The aircraft engines can be turbofan, turboprop or propfan engines mounted on the rear fuselage by means of pylons or turbofan engines attached directly to the rear fuselage.

The internal shield can be formed by a unitary piece attached to the rear fuselage or by a plurality of panels joined to a supporting structure attached to the rear fuselage, having advantageously a constant thickness.

In one embodiment, the energy absorption capability of the internal shield is comprised between 5-100 kJ. It is addressed to stop small fragments and some intermediate and large fragments.

In one embodiment the energy absorption capability of the internal shield is comprised between 5-15 kJ. It is addressed to stop small fragments.

Other characteristics and advantages of the present invention will be clear from the following detailed description of embodiments illustrative of its object in relation to the attached figures.

DESCRIPTION OF THE DRAWINGS

FIGS. 1a and 1b are, respectively, schematic perspective and plan views of the rear part of an aircraft whose fuselage is equipped with turbofan engines connected to the fuselage by pylons.

FIGS. 2a and 2b are, respectively, schematic perspective and plan views of the rear part of an aircraft whose fuselage is equipped with turboprop engines connected to the fuselage by pylons.

FIG. 3 is a perspective view of the rear part of an aircraft whose fuselage is equipped with turbofan engines connected directly to the fuselage.

DETAILED DESCRIPTION OF THE INVENTION

The invention is applicable to any kind of aircraft equipped with two engines mounted on each side of the rear fuselage such as those illustrated in FIGS. 1, 2 and 3.

In these aircraft, in the case of an engine failure, the opposite engine (including its critical systems, such as the electrical generation and fuel feed system) may be easily impacted by a detached part of one engine because of their proximity and the lack of strong and massive structural items between both engines. The involved risk is a failure of the opposite engine which would lead to a catastrophic event.

This risk is not avoided by impact resistant and damage tolerant fuselages such as those disclosed in WO 2009/068638 and US 2011/233335 because their main objective is not stopping completely any detached part of an engine that damages the fuselage but to provide the fuselage with the strength needed for a "get home mission" with one operating engine.

Figure 4A:
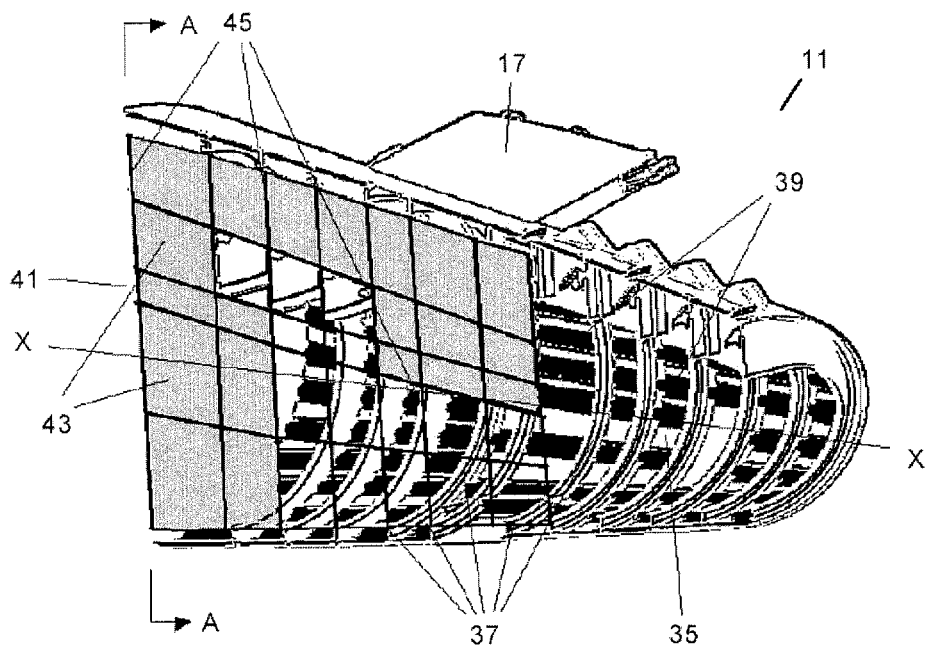
FIG. 4a is a perspective view of the rear part of an aircraft (with an upper part removed to improve the visibility of the interior) with a shield according to the present invention and FIG. 4b is a side view of a shield (isolated from the fuselage).
Figure 4B:
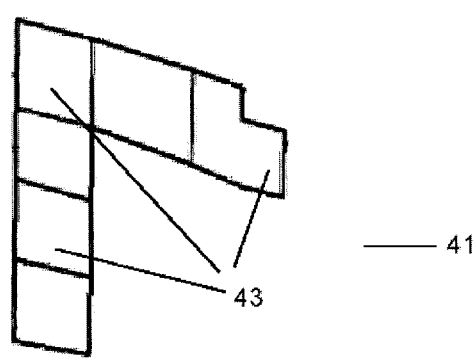

As shown in FIGS. 4a and 4b, the rear fuselage 11 of an aircraft with two engines according to the invention comprises a skin 35 stiffened by longitudinal stringers 39 and perpendicular frames 37 to the longitudinal axis X of the rear fuselage 11 and also comprises a shield 41 located in the vertical plane of symmetry A-A of the rear fuselage configured for avoiding the risk of an impact of a detached part of one engine on the opposite engine.

The shield 41 has a suitable geometric configuration so that the possible trajectories of a detached part of one engine that would potentially reach the critical components of the opposite engine will cross the shield 41 and a suitable energy absorption capability to stop said detached part to avoid that it can reach the opposite engine.

FIGS. 4a and 4b show a geometric configuration of a shield 41 obtained as an envelope of straight borders of the intersections of the vertical plane of symmetry of the aircraft with those possible trajectories of detached fragments of one engine that impact on critical elements of the opposite engine.

Figure 5:
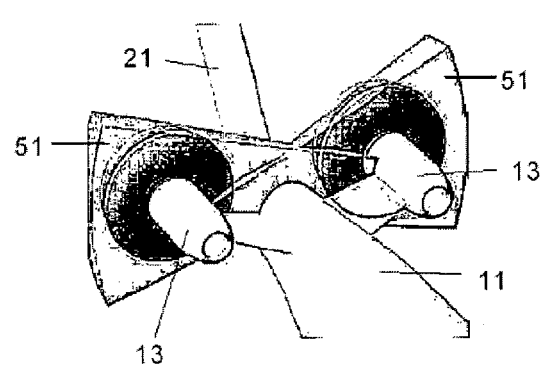
FIG. 5 is a perspective view of the rear part of an aircraft showing possible trajectories of detached fragments from one engine that can impact on the opposite engine.

The set of possible trajectories 51 (see FIG. 5) of detached fragments to be considered is obtained associating to a pre-selection of fragments taking into account all engine stages (rotor, turbine, propellers) their possible trajectories in a failure event.

The critical elements of the opposite engine are defined as those elements that cannot be lost when an engine fails such as the electrical generation, the engine fuel feed or the opposite engine blades. The strength of the shield 41 shown in FIGS. 4a and 4b depends on the level of energy of the fragments that need to be stopped according to the certification requirements and other relevant factors.

In this respect, said fragments in case of UERF or BR events can be classified as follows:

- Small fragments such as half a blade (tip) from any internal rotor or turbine of the engine. The order of magnitude is from 5 kJ to 15 kJ (depending of the engine stage that is considered).
- Intermediate/big fragments such as a ⅓ disk fragment or a blade of an open rotor. The order of magnitude is from 10 kJ to 100 kJ.

If the certification requirements for intermediate/big fragments are already fulfilled considering the fuselage and systems architecture of the aircraft, it is not necessary to cover such high levels of energy with the shield 41. In that case, the impact strength capability of the shield is limited to the small fragments.

In a first embodiment for an aircraft with engines connected to the fuselage by means of pylons or attached directly to the fuselage, the shield 41 is intended to stop, mainly, small fragments from UERF events (fragments involving approximately an energy of impact comprised between 5-15 kJ) when certification requirements for intermediate and large fragments are fulfilled without a shield (less than 5% of the trajectories are catastrophic).

In a second embodiment for an aircraft with engines connected to the fuselage by means of pylons or attached directly to the fuselage, the shield 41 is intended to stop small fragments from UERF events (fragments involving approximately an energy of impact comprised between 5-15 kJ) and also higher energy fragments (but not necessarily all intermediate/big fragments) when certification requirements for intermediate and large fragments are not fulfilled without a shield (usually more than 5% of the trajectories are catastrophic). In that case it is not necessary to stop all intermediate and large fragments but only a part of them to fulfill certification requirements.

The first embodiment is always the preferred one from the aircraft weight point of view. It is usually adapted to the needs of an aircraft with typical turbofan engines connected to the rear fuselage with a large distance between the engines.

On the other hand, when the distance between both engines is reduced (for example in the aircraft configuration with engines directly attached to the fuselage) or when very large engines are used (Ultra High By-pass ratio turbofan for example even if attached to the fuselage by means of pylons structure), it is not always possible to fulfill the high energy certification requirements. In that case, the second embodiment is more adapted to the needs of the case.

The same happens in the case of open rotor engines attached to the rear fuselage by means of pylons. Because of the additional catastrophic trajectories due to the blades, it is not possible to fulfill the high energy certification requirements. In that case, the second embodiment is also more adapted to the needs of the case.

The strength of the shield 41 depends on its material and thickness.

Suitable materials for the shield 41 are the following:
Rigid materials, particularly metallic materials, composite materials and ceramic materials.
Highly deformable materials (dry fabric materials).

The following list shows an estimation of the resistance needed and the corresponding thickness of a shield structured as a flat plate of a rigid material for withstanding an impact of a small fragment with energy of 8.2 kJ in a single aisle aircraft equipped with open rotor engines.

Titanium TA6V. Resistance: 50 kg/m2. Thickness: 10 mm.
High performance steels. Resistance: 40 kg/m2. Thickness: 5 mm.
Aluminum 2024T3. Resistance 60 kg/m2. Thickness: 20 mm.
Carbon, Glass or Kevlar Fibers Reinforced Materials. Resistance: 50 kg/m2. Thickness: 30 mm.

The following list shows an estimation of the resistance needed by a shield of a highly deformable material for withstanding an impact of a small fragment with energy of 8.2 kJ in a single aisle aircraft equipped with open rotor engines.

Aramid dry fabrics. Resistance: 30 kg/m2.
Poly-paraphenylene-2 6-benzobisozazole (PBO) dry fabrics. Resistance: 20 kg/m2.
Ultra-high molecular weight polyethylene fibers (UHMWPE). Resistance: 25 kg/m2.

More complex materials combining ceramic layers and dry fabrics layers can also be considered.

In the embodiment shown in FIGS. 4a and 4b the shield 41 is formed by several elements 43 with a flat shape (a flat plate if they are made of a rigid material or a piece of fabric if they are made of a deformable material) joined to a supporting structure formed by rigid profiled beams 45 that connect the upper and the lower parts of the frames 17. Said elements 43 have, preferably, a constant thickness as it can be considered that the angle of impact of a detached part in any point of them is a quasi-constant angle.

In another embodiment (not shown) the shield can be directly attached to the fuselage (to the skin or to the frames).

The main advantages of the invention are:
The shield can be optimized in weight due to its location in the symmetry plane of the aircraft that allows minimizing its surface (a shield on each side of the fuselage would have a greater surface).
The shield can be easily maintained because of its full accessibility. The accessibility to the fuselage is also improved compared to a solution with shields attached to the fuselage. Indeed, in our case, there is no need to remove the shields to inspect and repair the fuselage structure.
The shield does not involve any aerodynamic penalty because of its inner location.
The shield does not involve acoustics and/or vibration problems because is not directly connected to the acoustically excited area of the fuselage.
Easier manufacturing of the shields because its flat configuration (no need to adjust the shield to the curvature of the fuselage) and quasi constant angle of impact which implies a constant thickness of the shield.
The internal shield located in the aircraft plan of symmetry is also offering a safe architecture for any systems segregation. Indeed, some segregated systems like flight controls for example might be located on both sides of the shield.

Although the present invention has been described in connection with various embodiments, it will be appreciated from the specification that various combinations of elements, variations or improvements therein may be made, and are within the scope of the invention.

The invention claimed is:

1. An aircraft comprising a propulsion system formed by two engines mounted on each exterior side of a rear fuselage by pylons; the rear fuselage having a curved shape with at least a vertical symmetry plane and a central longitudinal axis, the rear fuselage being made of a composite material, the rear fuselage comprising a skin and a plurality of frames arranged perpendicularly to the longitudinal axis, the rear fuselage being made of a composite material, wherein the rear fuselage comprises an internal shield the vertical symmetry plane in an area that covers the possible trajectories of a set of pre-defined fragments detached from one of the engines in a failure event that would impact on critical elements of the opposite engine, the internal shield having a flat shape and an energy absorption capability that allows stopping said fragments, and the internal shield is formed by a plurality of panels joined to a supporting structure attached to the rear fuselage.

2. The internal shield according to claim 1, wherein the internal shield made of a rigid material or of a deformable material or of a combination of several layers of rigid and/or deformable materials.

3. The internal shield according to claim 2, wherein the rigid material is one of the following: titanium, high performance steel, aluminum, carbon fiber reinforced material, glass fiber reinforced material, ceramic material.

4. The internal shield according to claim 2, wherein the deformable material is one of the following: an aramid dry fabric, a poly-paraphenylene-2 6-benzobisozazole (PBO) dry fabric, ultra-high molecular weight polyethylene fibers (UHMWPE).

5. The aircraft according to claim 1, wherein the two engines are turbofan, turboprop or propfan engines.

6. The aircraft according to claim 1, wherein the internal shield is formed by a unitary piece attached to the rear fuselage.

7. The aircraft according to claim 1, wherein each panel has a constant thickness.

8. The aircraft according to claim 1, wherein the energy absorption capability of the internal shield is comprised between 5-100 kJ.

9. The aircraft according to claim 8, wherein the energy absorption capability of the internal shield is comprised between 5-15 kJ.

\* \* \* \* \*